United States Patent
Bucher et al.

(10) Patent No.: US 10,729,979 B2
(45) Date of Patent: *Aug. 4, 2020

(54) AUTOMATED TUNING OF COMPUTER-IMPLEMENTED GAMES

(71) Applicant: Zynga Inc., San Francisco, CA (US)

(72) Inventors: Jason Bucher, San Francisco, CA (US); Alexandros Ntoulas, San Jose, CA (US); Xinxian Huang, Santa Clara, CA (US); Brett Bauleke, Venice, CA (US); Moises Goldszmidt, Palo Alto, CA (US); Samer Ead, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/139,842

(22) Filed: Sep. 24, 2018

(65) Prior Publication Data

US 2019/0022531 A1 Jan. 24, 2019

Related U.S. Application Data

(63) Continuation of application No. 15/351,190, filed on Nov. 14, 2016, now Pat. No. 10,105,603.

(60) Provisional application No. 62/255,048, filed on Nov. 13, 2015.

(51) Int. Cl.
*A63F 13/67* (2014.01)
*A63F 13/79* (2014.01)
*A63F 13/46* (2014.01)
*A63F 13/798* (2014.01)

(52) U.S. Cl.
CPC .............. *A63F 13/67* (2014.09); *A63F 13/46* (2014.09); *A63F 13/79* (2014.09); *A63F 13/798* (2014.09)

(58) Field of Classification Search
CPC ........ A63F 13/67; A63F 13/798; A63F 13/46; A63F 13/79
See application file for complete search history.

(56) References Cited

U.S. PATENT DOCUMENTS

2006/0003826 A1 1/2006 Walker et al.
2008/0266250 A1 10/2008 Jacob
2017/0136362 A1 5/2017 Bucher et al.

OTHER PUBLICATIONS

"U.S. Appl. No. 15/351,190, Non Final Office Action dated Dec. 6, 2017", 10 pgs.
"U.S. Appl. No. 15/351,190, Notice of Allowance dated Jun. 15, 2018", 9 pgs.
"U.S. Appl. No. 15/351,190, Response Filed May 7, 2018 to Non Final Office Action dated Dec. 6, 2017", 10 pgs.

*Primary Examiner* — Kevin Y Kim
(74) *Attorney, Agent, or Firm* — Schwegman Lundberg & Woessner, P.A.

(57) ABSTRACT

A system for automated tuning of a computer-implemented game is configured to enable definition of a performance metric indicative of player performance in a computer-implemented game that has tunable gameplay parameters. A performance target is defined that represents target values for the performance metric during progress in the game. The system executes a gameplay simulation using an automated player, and performs an iterative tuning operation based on results of the simulation. The tuning operation automatically determines a suggested value set for the tunable parameters.

20 Claims, 10 Drawing Sheets

Examples of Goals (Outcomes after 100 days) per Cohort

| Metric | High Engaged Payer | High Engaged Non-payer | Medium Engaged Payer | Medium Engaged Non-payer | Low Engaged Non-payer |
|---|---|---|---|---|---|
| Level | 30 | 28 | 22 | 16 | 11 |
| Total XP Generated | 2.3M | 1.7M | 575K | 175K | 50K |
| Total Coin Generated | 11M | 7M | 2.5M | 600K | 175K |
| Total Coin Spent | 9.8M | 6.5M | 2.2M | 580K | 170K |
| Expansions Purchased | 22 | 18 | 16 | 12 | 10 |
| Well Upgrades | 10 (max) | 8 | 4 | 3 | 2 |
| Silo Upgrades | 10 (max) | 8 | 5 | 2 | 2 |

AUTOMATED TUNING OF COMPUTER-IMPLEMENTED GAMES

CLAIM OF PRIORITY

This application is a continuation of U.S. patent application Ser. No. 15/351,190, filed on Nov. 14, 2016, which claims the benefit of priority to U.S. Provisional Application Ser. No. 62/255,048, filed on Nov. 13, 2015, the contents of each of which are incorporated by reference herein in their entireties.

BACKGROUND

In many games, there is a virtual world or some other imagined playing space where a player/user of the game controls one or more player characters (herein "character," "player character," or "PC"). Player characters can be considered in-game representations of the controlling player. The game display can display a representation of the player character. A game engine accepts inputs from the player, determines player character actions, decides outcomes of events and presents the player with a game display illuminating what happened. In some games, there are multiple players, wherein each player controls one or more player characters. Some games have no in-game character controlled by the player, but may instead provide for player control of game elements on a gameboard. Examples include word building games, puzzle games, match-three puzzle games, and the like.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer). In some embodiments, a game interface for the computer-implemented game can instead or additionally comprise an augmented reality display or a virtual reality display.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Computer-implemented games thus often have a number of parameters and/or configurations that can be changed by an operator during game design or game tuning to change different aspects of gameplay and in-game economy. Examples of such tunable parameters vary from game to game, but can include, for example in the context of a farming simulation social network game such as Farmville™ provided by Zynga, Inc.: time required to next level-up, coins needed for an expansion, number of materials required for a buildable, number of gifts one can send or receive.

Tuning and optimization of gameplay and economy parameters has a major effect on engagement, retention and monetization of any game. Proper tuning of a game may allow players to enjoy the game more than would be the case for the same game tuned less optimally, thus resulting in greater player retention and associated revenue. Suboptimal tuning of a game may result in increased player dissatisfaction, resulting to increased rates of players quitting the game.

Because the parameter space of tunable parameters is in many cases extremely large, manual adjustment of game parameters by tuning experts can be time consuming, ad hoc, and often provides suboptimal results.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
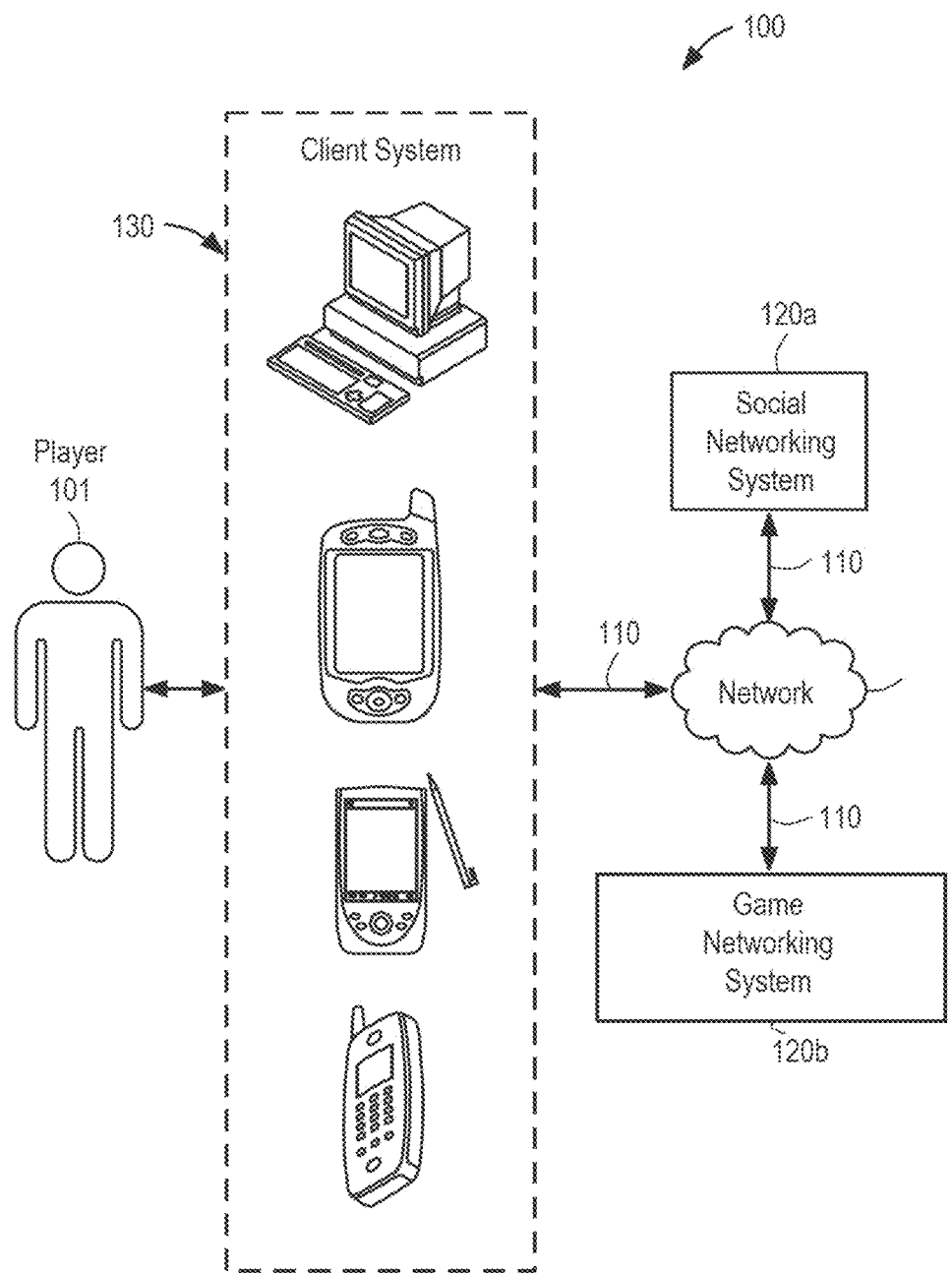
FIG. 1 is a schematic diagram showing an example of a system, according to some example embodiments.

Online Games and Game Systems Architecture and Background
Game Networking Systems In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b* (i.e. online gaming system), which includes a Notification Generator 150 that performs operations according to embodiments as described herein. The game networking system 120*b* can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Storing Game-Related Data

A database may store any data relating to game play within a game networking system 120*b*. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120*b* may determine the player's friend preferences based on player attributes that the player's first-degree friends have in common, and may store these player attributes as friend preferences in the player profile. Furthermore, the game networking system 120*b* may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120*b* may determine the player's likelihood to lead value based on information from other players that interact with this player. For example, the game networking system 120*b* may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120*b* may also determine the player's likelihood to lead value based on information about the player's interactions with others and the outcome of these interactions. For example, the game networking system 120*b* may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120b may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
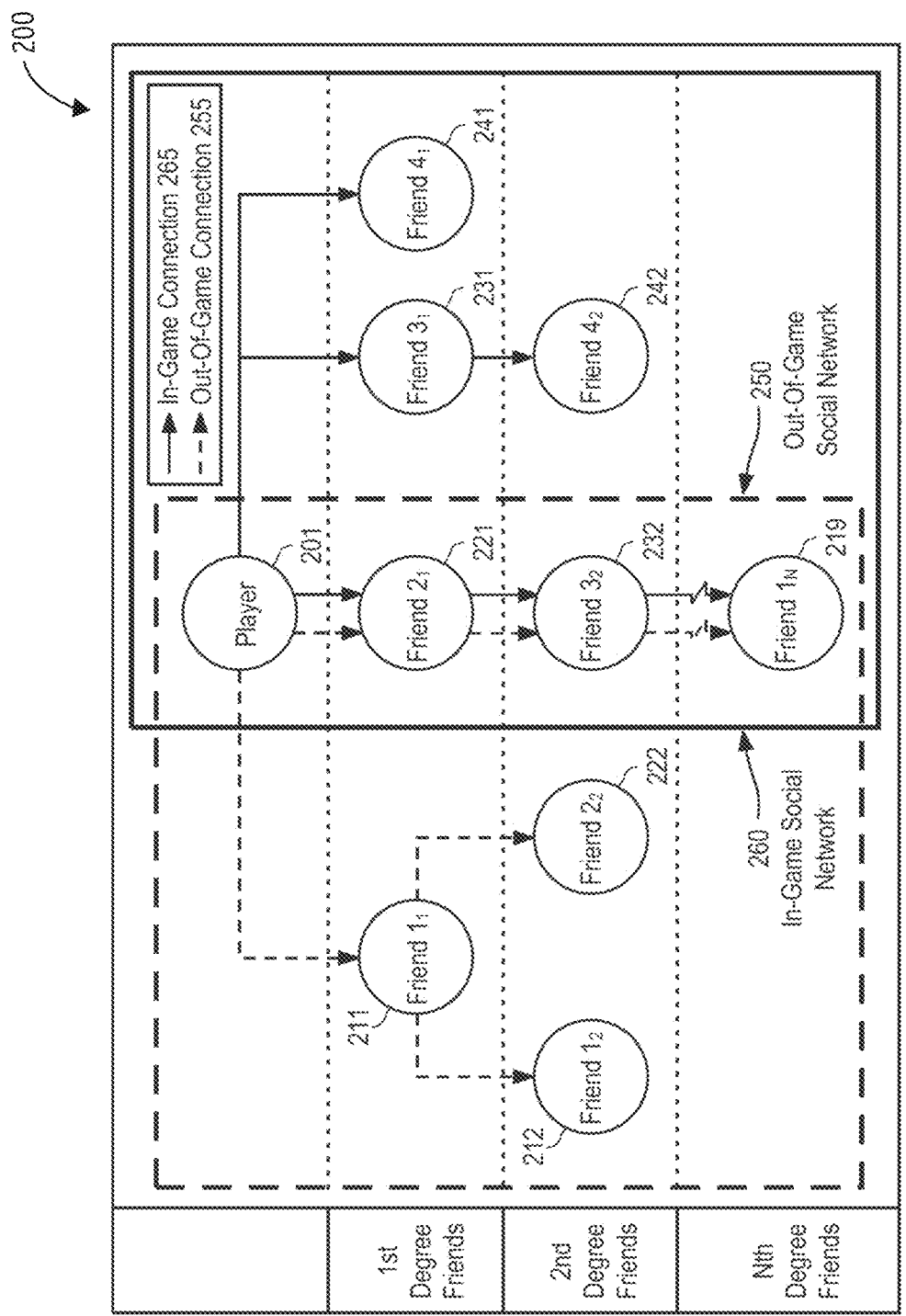
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user," and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Data Flow

Figure 4:
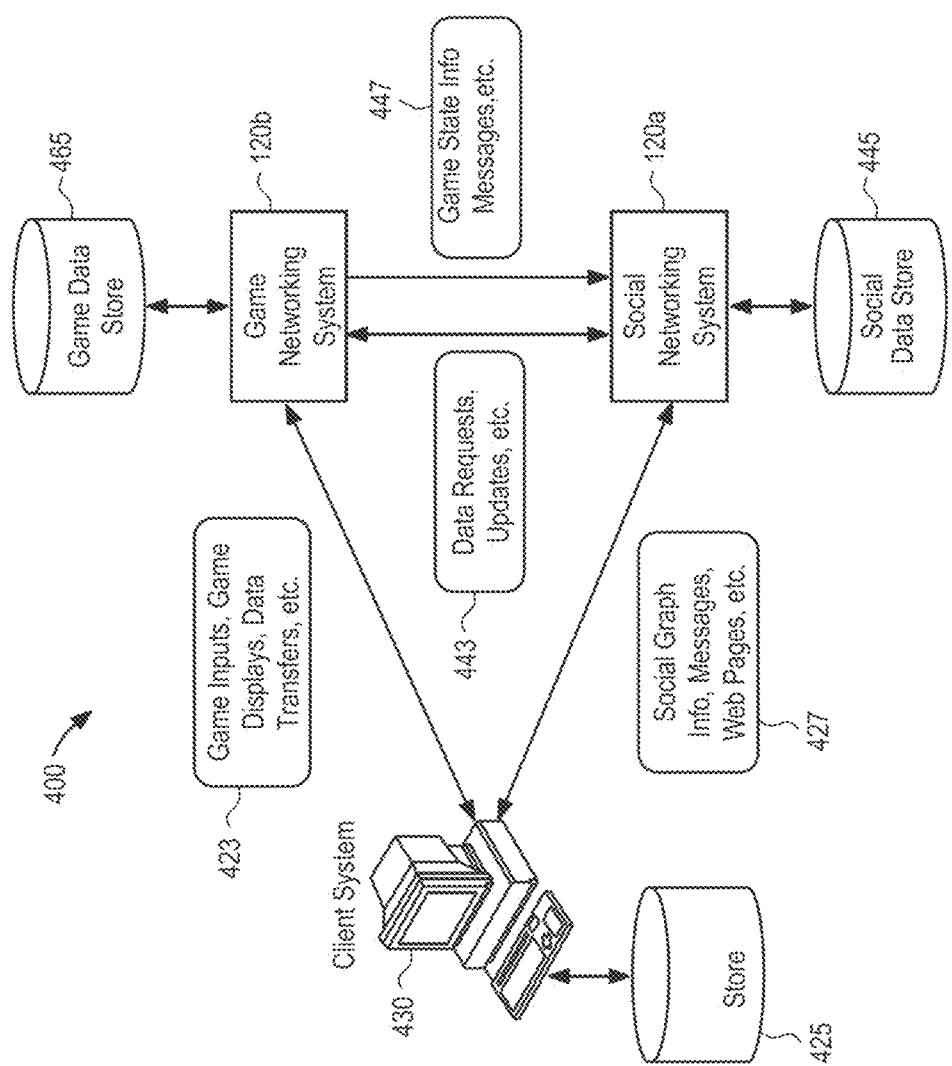
FIG. 4 is a diagrammatic representation of an example data flow between example components of the example system of FIG. 1, according to some example embodiments.

FIG. 4 illustrates an example data flow between the components of system 600. In particular embodiments, system 400 can include client system 430, social networking system 120a (i.e. social network system), and game networking system 120b (i.e. online game system system). The components of system 400 can be connected to each other in any suitable configuration, using any suitable type of connection. The components may be connected directly or over any suitable network. Client system 430, social networking system 120a, and game networking system 120bb can each have one or more corresponding data stores such as local data store 435, social data store 445, and game data store 465, respectively. Social networking system 120a and game networking system 120b can also have one or more servers that can communicate with client system 430 over an appropriate network. Social networking system 120a and game networking system 120b can have, for example, one or more internet servers for communicating with client system 430 via the Internet. Similarly, social networking system 120a and game networking system 120b can have one or more mobile servers for communicating with client system 430 via a mobile network (e.g., GSM, PCS, Wi-Fi, WPAN, etc.). In some embodiments, one server may be able to communicate with client system 430 over both the Internet and a mobile network. In other embodiments, separate servers can be used.

Client system 430 can receive and transmit data 423 to and from game networking system 120b. This data can include, for example, webpages, messages, game inputs, game displays, HTTP packets, data requests, transaction information, updates, and other suitable data. At some other time, or at the same time, game networking system 120b can communicate data 443, 447 (e.g., game state information, game system account information, page info, messages, data requests, updates, etc.) with other networking systems, such as social networking system 120a (e.g., Facebook, Myspace, etc.). Client system 430 can also receive and transmit data 427 to and from social networking system 120a. This data can include, for example, webpages, messages, social graph information, social network displays, HTTP packets, data requests, transaction information, updates, and other suitable data.

Communication between client system 430, social networking system 120a, and game networking system 120b can occur over any appropriate electronic communication medium or network using any suitable communications protocols. For example, client system 430, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 430 for use by a client-side executed object to process. In particular embodiments, the client-side executable may be a FLASH-based game, which can de-serialize the game state data in the BLOB. As a player plays the game, the game logic implemented at client system 430 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 430. At any given time, there may be multiple players at multiple client systems 430 all playing the same online game. In practice, the number of players playing the same game at the same time may be very large. As the game progresses with each player, multiple players may provide different inputs to the online game at their respective client systems 430, and multiple client systems 430 may transmit multiple player inputs and/or game events to game networking system 120b for further processing. In addition, multiple client systems 430 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 430. As an example and not by way of limitation, a client application downloaded to client system 430 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 430, either caused by an action of a game player or by the game logic itself, client system 430 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 400 is discussed in reference to updating a multi-player online game hosted on a network-addressable system (such as, for example, social networking system 120a or game networking system 120b), where an instance of the online game is executed remotely on a client system 430, which then transmits application event data to the hosting system such that the remote game server synchronizes game state associated with the instance executed by the client system 430.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 430 may include a Flash client. The Flash client may be configured to receive and run Flash application or game object code from any suitable networking system (such as, for example, social networking system 120a or game networking system 120b). In particular embodiments, the Flash client may be run in a browser client executed on client system 430. A player can interact with Flash objects using client system 430 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 430, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 430 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 430. In particular embodiments, the batch file may be a text file and the name-value pairs may be in string format.

In particular embodiments, when a player plays an online game on client system 430, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Detailed Description of Example Embodiment

Bearing in mind the above-described general environment and architecture for the implementation of computer-implemented games, an example embodiment of a method and a system for automated tuning of computer-implemented games will now be described in greater detail.

Example Method

Figure 7:
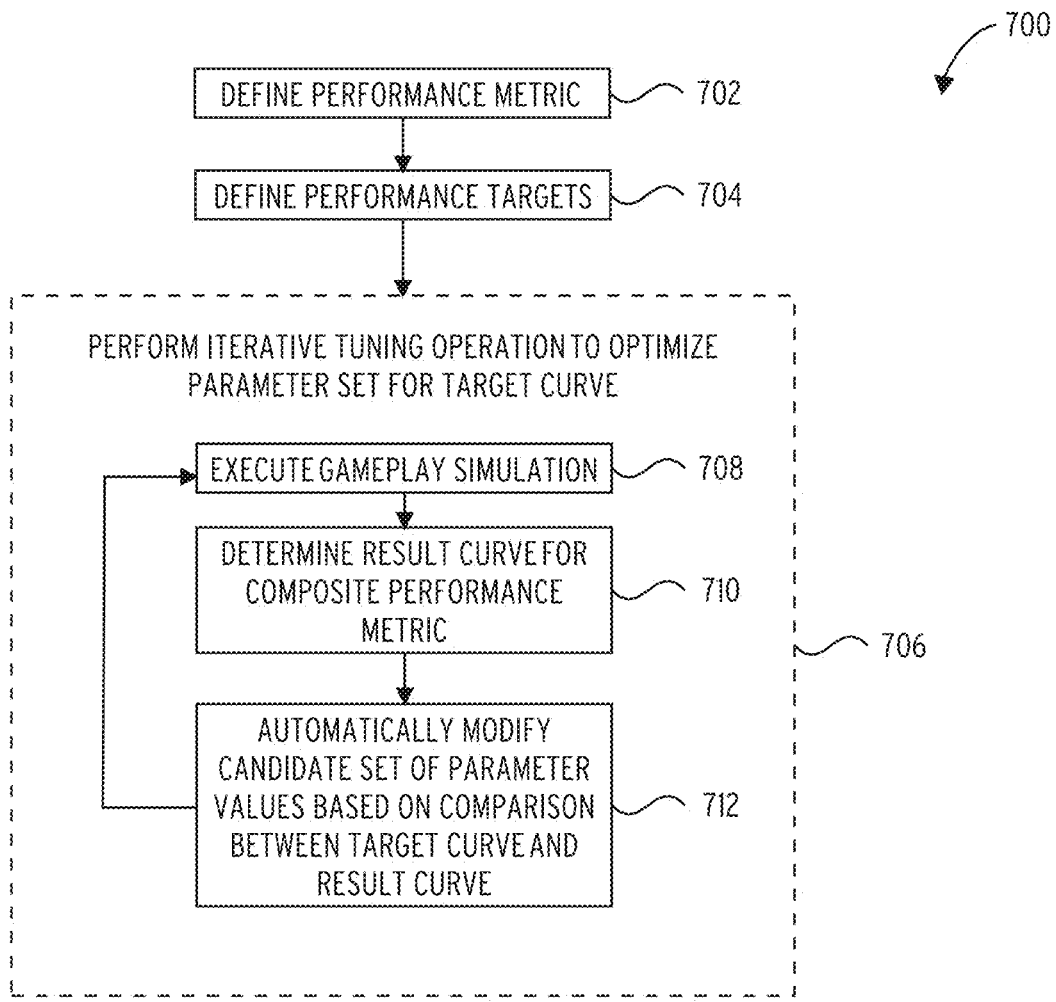
FIG. 7 illustrates a method for automated tuning of game parameters, in accordance with one embodiment.

In FIG. 7, flowchart 700 illustrates one example embodiment of a method for automated parameter tuning of a computer-implemented game using novel tuning techniques consistent with the disclosure. In this description, a FarmVille-type game is used as an example game or for automated tuning, but it should be appreciated that the disclosed techniques are applicable to many different games.

In broad overview, the example method of flowchart 700 comprises defining a performance metric (at block 702) as a function of a plurality of different performance measures. At block 704, a performance target is defined that specifies target values for the performance metric at one or more points of progress during the game. In some embodiments, the performance target is a target curve for the performance metric at different points of game progression. At procedure 706, an automated iterative tuning operation is performed to optimize a set of tunable game parameters based on the target curve.

In this example embodiment, the iterative tuning operation of procedure 706 comprises executing a gameplay simulation, at block 708, in which an artificially intelligent player (e.g., an AI bot) plays the game based on a candidate set of game parameters. Based on statistics obtained from the executed gameplay simulation, a result curve for the performance metric obtained during the gameplay simulation is determined, at operation 710, whereafter the game parameters are automatically modified, at operation 712, based on a comparison between the target curve and the result curve for the composite performance metric. Modification of the game parameter set thus provides a new candidate set of game parameters used in a subsequent iteration of performance of the operations of block 708 through block 712.

Example System

Figure 8:
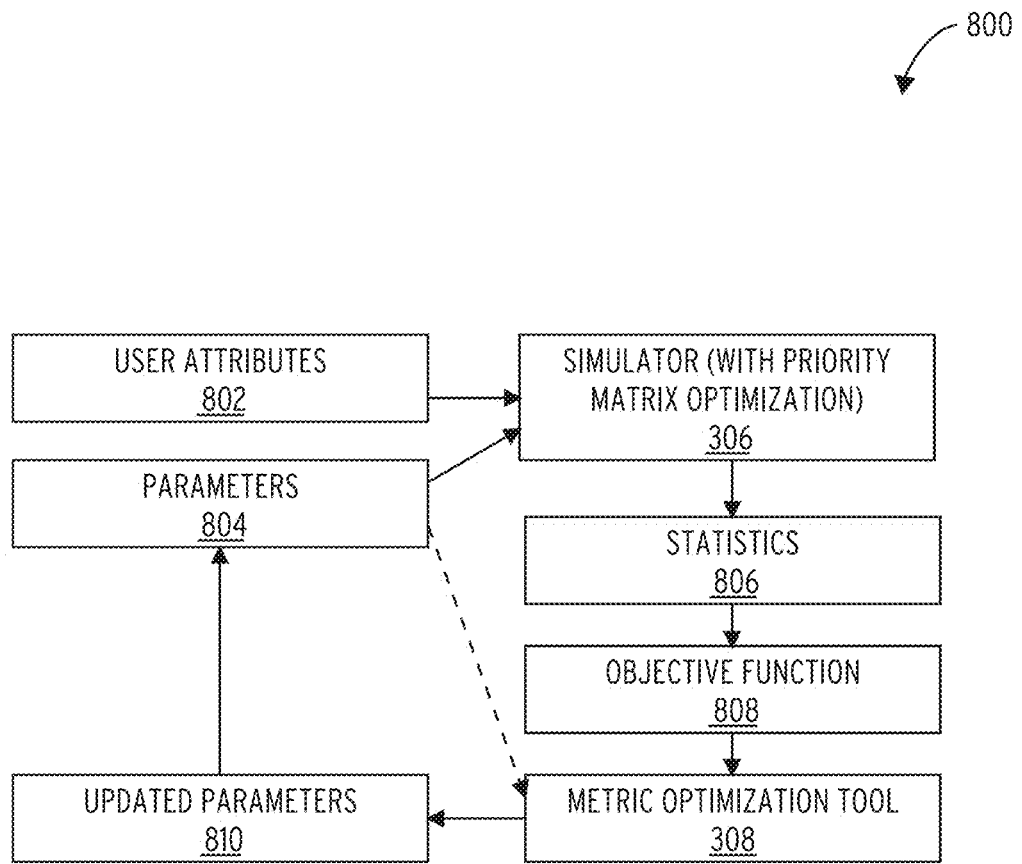
FIG. 8 illustrates a flow diagram schematically illustrating process flow of an iterative tuning procedure according to one example embodiment.

FIG. 8 is a schematic flow diagram broadly illustrating operational flow in a system 800 for automated game tuning. The system 800 comprises a simulator 306 and a metric optimization tool 308 forming part of the system 800. Other components of the system 800 illustrated in FIG. 8 include a number of data items stored in memories or databases forming part of the system 800. These data items include user attributes 802, statistics 806, an objective function 808, and updated parameters 810. For simplicity of illustration, these data items are not shown as being stored on the associated memory device(s), as is the case, but are instead showed as freestanding items in order to provide a graphic representation of operational flow of a method executed by use of the system 800. As will be described in greater detail below, the user attributes 802 and the set of tunable game parameters 804 are provided as inputs to the simulator 306, which performs the example iterative tuning procedure 706 with priority matrix optimization (see FIG. 7).

The simulator 306 produces simulation result statistics 806 that are used by the metric optimization tool 308 together with an objective function 808 representing the composite performance metric to devise updated game parameters 810. The updated parameters 810 are then used for performing a successive iteration of the gameplay simulation by the simulator 306, followed by further modification of the game parameters by the metric optimization tool 308.

Figure 3:
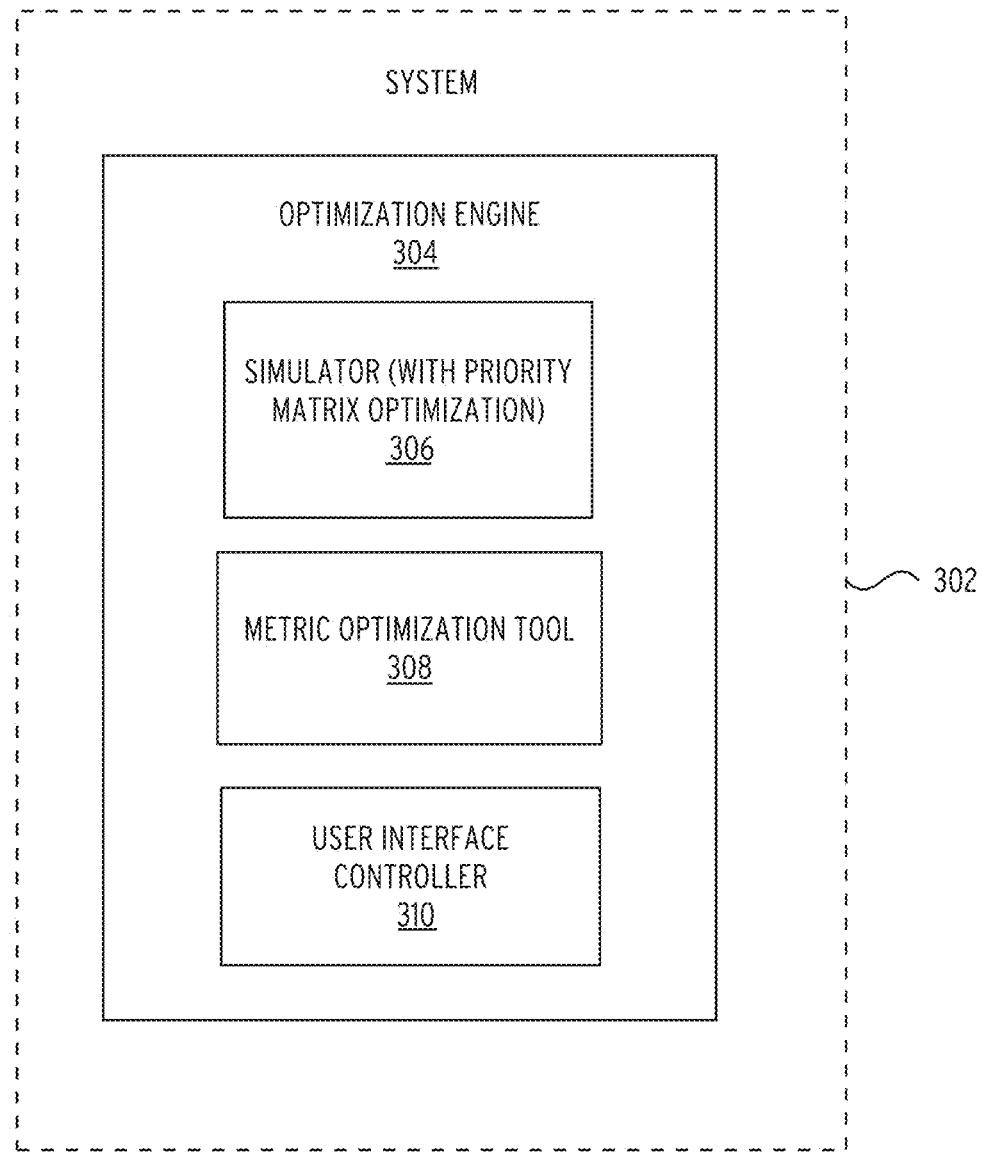
FIG. 3 is a block diagram illustrating components of a game parameter tuning system, according to some example embodiments.

In FIG. 3, reference numeral 302 generally indicates an example system for automated game parameter tuning, according to one example embodiment. In this example embodiment, the system 302 is configured to perform the method of FIG. 7, and to provide the respective features described with reference to FIG. 8.

The system 302 includes an optimization engine 304 that includes a simulator 306 (in this instance providing the simulator 306 described with reference to FIG. 8), a metric optimization tool 308 (in this instance providing of the tool 308 of FIG. 8), and a user interface controller 310 to control generation and operation of a user interface through which a game designer can, for example, input definitions of the performance metric and the performance targets, and in which results of gameplay simulation and game parameter optimization are displayed to the player. The metric optimization tool 308 include one or more memories on which is stored the respective data fields and/or items discussed elsewhere herein and illustrated schematically in FIG. 8.

The various features outlined broadly above will now be described below in greater depth.

Performance Targets

Before automated game tuning is commenced, performance goals or targets for the plurality of different performance measure are defined (see operation 704, FIG. 7). Each performance measure indicates a different respective aspect of player performance in the game. In this example embodiment, the performance measures for which respective performance targets can be defined comprise the following performance measures:

(a) a game level attained by the player, the game having different levels through which a player progresses based on in-game performance;
(b) total experience points (XP) generated by the player in the game;
(c) total in-game currency (also referred to herein as total coin) generated by the player;
(d) total in-game currency or coin spent by the player;
(e) the number of expansions purchased;
(f) the number of well-upgrades executed; and
(g) the number of silo-upgrades executed by the player.

It will be appreciated that different or additional performance measures may be selected by the game designer for the example game, and that a different set of performance measures may be selected for different games. Moreover, as will be seen from the description that follows, the composite performance metric is in this example embodiment defined as being a function of only three of the above-listed example performance measures, but other embodiments may provide for the definition of the performance metric as a function of a different combination of, or all of the performance measures provided by a game designer in defining the performance targets.

Figure 9:
FIG. 9 illustrates a set of performance targets to which game parameters are to be tuned, according to one example embodiment.

In this example embodiment, players are grouped into different cohorts based on engagement and payment attributes, with different performance targets being provided for the different cohorts. FIG. 9 shows an example performance target matrix 900 used in one example embodiment to define target performance of multiple cohorts within the game.

The target performance information in this example embodiment defines five cohorts, namely high engaged payers, high engaged non-payers, medium engaged payers, medium engaged nonpayers, and low engaged nonpayers. The specified value for each of the respective performance measures in the corresponding cohort in this example embodiment specifies the target outcome after 100 days, per cohort. Thus, for example, the target level to be obtained by a player in the high engaged player cohort is, in this example, level 30. The target XP to be generated by this cohort after 100 days is 2, 3 million XP points, and so forth.

It will be appreciated that different performance targets are thus specified for the different cohorts, and that the parameter tuning comprises optimizing the parameter set (and/or the priority matrix) to conform to the performance targets. Tuning optimization may thus in some example embodiments be performed separately for the different cohorts.

Note that in the example performance targets provided in table 900, respective target values are provided only for a terminal value, i.e., a 100 days target. The performance targets may in some embodiments, however, define not only a target end value, but may instead or in addition define a target curve that represents multiple target values at different respective points of progress within the game. Thus, for example, the target curve may express the value of the composite performance metric (as described below) with progression through different levels, with progression in time, or with progression measured by any other suitable parameter.

Composite Performance Metric

To run the metric optimization tool 308, a composite performance metric or response variable that can be minimized or maximized is defined (see operation 702, FIG. 7). The target performance measures for which the game is to be tuned are values of a group of different performance measures. The performance metric is defined so as to integrate those measures/metrics into one value.

In this example embodiment, the composite performance metric is defined as being a function of three different performance measures, namely game level, total generated coins, and number of expansions purchased in game by the player. Note that, in other embodiments, a different number or combination of performance measures may be used together to constitute the composite performance metric.

Returning to the present example, it will be appreciated that the level, total generated coins and number of expansions are in different units of measurement and can thus be of different orders of magnitude. To unify these disparate performance measures in an accurately representative composite performance metric, they are translated to the same level and to a common unit of measurement. This is achieved in this example embodiment by identifying estimated times needed to achieve respective values for those 3 metrics, where the respective times are of the same order of magnitude. These time values are then employed to form weighting coefficients that translate the respective performance measures to a common unit of measurement. The composite performance metric is in this example provided by the weighted sum of the different performance measures.

Expressed mathematically, let $$V = y + \frac{a}{b}x + \frac{c}{b}z \tag{1}$$

where, x, y and z are in this instance the target values or the values from simulation.

x is game level,
y is total generated coins (in the unit million),
Z is the number of expansions effected,
a: time to get to next level,
b: time to make 1 million coins, and
c: time to earn next expansion.

The values of a, b and c are chosen around the target point or level. In this example embodiment, a decision on whether to use the left interval or right interval is executed after receiving the simulation results. For example, assuming the target level is 20, the left interval means considering the time from level 19 to level 20 and the right interval means that interval from level 20 to level 21. a/b x translates levels to the value of coins and c/b z translates expansions to coins.

User Attributes

User attributes 802 (see FIG. 8) include the initial attributes of the player, e.g., the current level, items in the storage, the number of expansions available, and so on. The user attributes 802 can thus include all relevant game state information and/or player state information necessary for the simulator 306 to perform a gameplay simulation.

Parameters

The tuning parameters 804 are the tuning features of the game, e.g., the selling price of items on the board, the waiting time of planting crops or the order of upgrading different buildings, etc. For the tuning parameters, there are in this example embodiment two types of optimization. One is optimizing numerical values, e.g., the selling price of an item, the waiting time of planting a crop.

The other type is optimization of the priority matrix, e.g., the order of upgrading buildings (e.g., Silo first or well first), or other options. The tunable parameters of the game can in other words include both metric parameters that have tunable values, and the priority matrix, which defines sequential or hierarchical relationships between a plurality of different in-game actions. The priority matrix thus comprises one or more predefined sequences in which respective in-game actions are to be performed for achieving corresponding in-game benefits.

In some parts of this description, the tunable metric parameters and the priority matrix together are referred to as a tunable game configuration or as the tunable game parameters.

Optimizing these two types of parameters (i.e., parameter values and priority matrix) in a single process is problematic. The iterative tuning operation in this example embodiment provides for separate optimization of the metric game parameters and of the priority matrix. Referring again to FIG. 8, it will be seen that the optimization of numerical parameters will be conducted by the metric optimization tool 308, while the priority matrix optimization is in this example embodiment integrated within the game simulation performed by the simulator 306.

Simulation with Priority Matrix Optimization

A specifically configured simulation engine (in this example embodiment provided by the simulator 306) receives as input the values of the user attributes 802 and the tunable parameters 804 (including this example embodiment both the metric game parameters and definitions of priority matrix components). Based at least in part on these inputs, the simulator 306 then simulates a simplified FarmVille game by second for 100 days (see operation 708 in FIG. 7), and outputs relevant simulation result statistics 806 for analysis and further processing. The statistics 806 in this example may include, for instance, the total generated coins, the number of expansions purchased and their trends by day or by level as well. The outputs of the simulator 306 is thereafter analyzed and used in the objective function 808 and metric optimization tool 308 parts, as illustrated schematically in FIG. 8.

Note, again, that the automated game simulation performed by the simulator 306 in this example includes optimization of the priority matrix, which assists in determining an optimal order of in-game actions the player can take. In this embodiment, the simulator 306 uses an appropriate search algorithm (A* pathfinding algorithm, Monte Carlo tree search, etc.) to find the best path. Before running optimization, a game designer may thus build an "action tree" (i.e., the possible actions the player can take at particular in-game statuses or nodes), which serves as part of the inputs provided to the simulator 306.

In some embodiments, priority matrix optimization may comprise optimizing the structural arrangement and relationship of different in-game actions within the game, so that players of the game is limited to performing these actions in particular order based on the priority matrix definition. Instead, the priority matrix optimization may serve to optimize performance by the artificial player during simulation of in-game actions consistent with a predefined action order or hierarchy, which may remain unchanged during the iterative optimization procedure.

As described above, the outputs from simulation with priority matrix optimization by the simulator 306 are the metrics under consideration, including, for instance, the level the player reaches after playing 100 days, the total generated coins, the number of expansions purchased and their progress trends, etc. First, from the trends, a general idea about the domains of the parameters will be obtainable, which will lead the game to a reasonable and stable status, avoiding extreme or imbalanced cases. Then those valid simulation results will be processed using the objective function 808 and the metric optimization tool 308. The game simulation result statistics 806 thus provides historical data that the optimization engine can run on.

Objective Function

Figure 10:
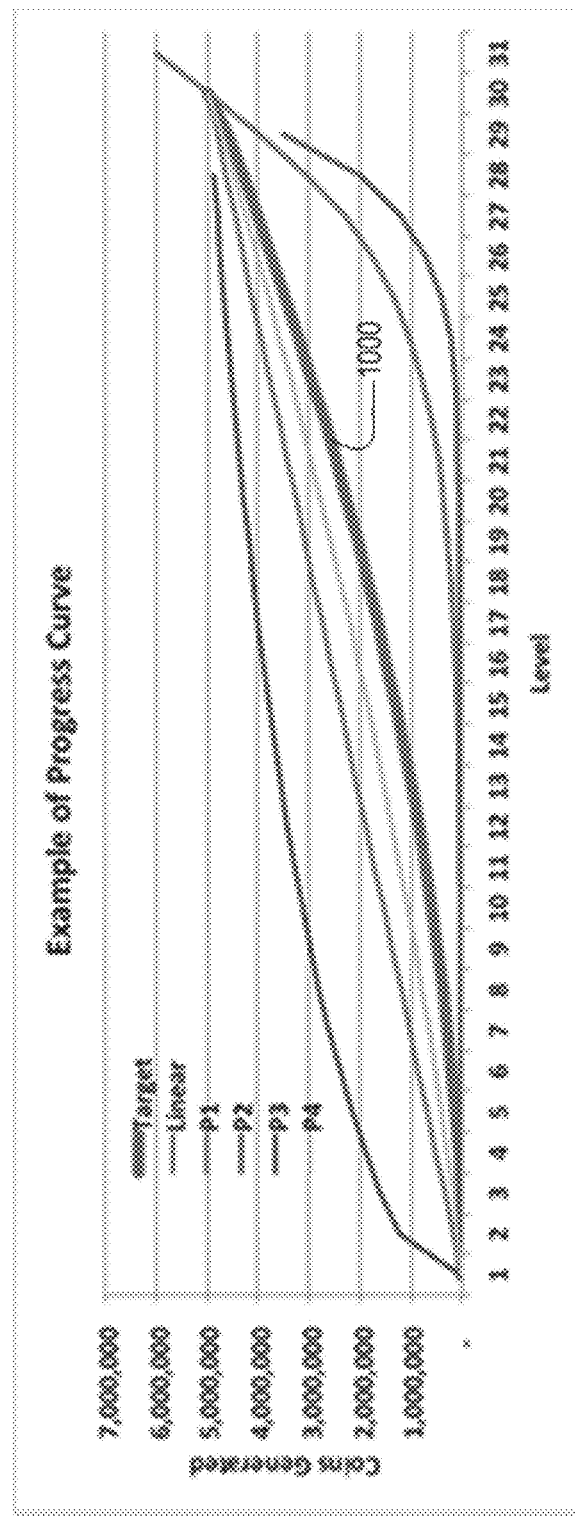
FIG. 10 illustrates an example target graph and a plurality of simulation result graphs for game progress expressed as a quantified composite performance metric that is a function of multiple different performance measures, according to one example embodiment.

Processing of the game simulation results using the objective function 808 serves to provide one or more quantified differences between the predefined performance targets and the simulation results (see, for example, operation 710 in FIG. 7). In this example embodiment, the performance targets are defined as a target progress curve, such as an example target curve 1000 shown in an example graph in FIG. 10. The objective function 808 in this example embodiment comprises two parts, namely:

(1) Minimizing the distance from the simulation end point to the target end point. If two points are equidistant from the target end point, then the one "above" the target point is preferred. As mentioned previously, the target endpoint and the simulation endpoint in this example embodiment comprises the value of the composite performance metric, expressed in coins generated, after 100 days of play.

(2) Minimizing the area between the simulation progress curve and the target progress curve. Again, if two simulated result curves are equidistant from the target curve (i.e., define an equal area between the result curve and the target curve), the simulated result curve above the target curve 1000 is preferred. It will be seen in the graph of FIG. 10 that those curves other than target curve 1000 represent results of respective iterations of simulated game play.

1st Part of Objective Function

The 1st part of the objective function is to measure the distance from the target end point to the simulation end point after 100 days. Let, using equation (1), $x_t$, $y_t$ and $z_t$ be the target level, target total generated coins (in the unit of million) and the target number of expansions, respectively, and $x_s$, $y_s$ and $z_s$ be the corresponding values from simulation. The $1^{st}$ part of the objective function is set as:

$$D_1 = (V_t - V_s)^2 + \varepsilon(V_t - V_s)$$

$$= \left[(y_t - y_s) + \frac{a}{b}(x_t - x_s) + \frac{c}{b}(z_t - z_s)\right]^2 +$$

$$\varepsilon\left[(y_t - y_s) + \frac{a}{b}(x_t - x_s) + \frac{c}{b}(z_t - z_s)\right]$$

where $\varepsilon \geq 0$, $V_t$ is the V value calculated for the target point and $V_s$ is the V value for the simulation output. The second term $\varepsilon(V_t - V_s)$ Is used by the metric optimization tool 308 to choose the solution above the target point. The unit of a, b and c could be hours or days and the unit for y could also be changed to others if million is not appropriate. The smaller $D_1$ is, the better.

2nd Part of Objective Function

The $2^{nd}$ part of the objective function $D_2$ is to measure the deviation of the simulation generated curve from the predetermined target curve.

$$D_2 = \frac{1}{n}\sum_{i=1}^{n}(S_i - T_i)^2 - \mu\frac{1}{n}\sum_{i=1}^{n}\text{sign}(S_i - T_i)$$

where $\mu \geq 0$ and this second term helps the algorithm prefer the curve above the target curve when two simulation curves are almost equidistant from the target; n takes the smaller value between the target level and the level the simulation reaches after 100 days. $T_i$ is the total generated coins value on the target curve at level i and $S_i$ is the value of the simulation curve at level i. sign( ) function equals 1 if the variable is positive, −1 if the variable is negative and 0 for 0. The smaller $D_2$ is, the better.

Entire Objective Function

Combining the 1 st and 2nd parts of the objective function:

$$D = \alpha D\_1 + (1-\alpha)D\_2$$

where $0 \leq \alpha \leq 1$. When $\alpha=1$, $D=D\_1$ and when $\alpha=0$, $D=D\_2$. Different a values put different weights on D_1 and D_2. An appropriate a value is chosen according to the simulation results, as well as based on inputs provided by game designers.

Metric Optimization Tool and Updated Parameters

After the objective function 808 is used for processing simulation results, as described above, the resulting value of D and the corresponding parameter values are provided as inputs to the metric optimization tool 308. In this example embodiment, the metric optimization tool 308 uses an open source machine learning tool from Yelp (Metric Optimization Engine—MOE), to solve the optimization problem for those numerical parameters. MOE provides various methods for optimization, e.g., stochastic gradient descent algorithm, Gaussian Process, etc. Then, MOE will suggest a new set of parameter values for minimizing the objective function. These are the updated parameters 810 schematically shown in FIG. 8.

The initial parameters 804 are replaced with the updated parameters 810 (see operation 712 in FIG. 7), and the simulation is re-run. Note that the metric optimization tool 308 in subsequent iterations uses not only the most recent updated parameters 810, but also uses historical data that indicate respective previous parameter sets associated with a corresponding result curve.

Thus, in a second iteration, for example, a new objective function value as well as the values for the most recent updated parameters 810 are fed into MOE together with historical data. In the second round, MOE therefore has two sets of historical data to run the algorithm and give another next-best-guess. As more and more simulations run, the prediction of the optimal solution from MOE will be getting better and better.

In summary, user attributes (initial status of the player) and the current values of tuning parameters are input to the simulator 306, which simulates the mechanics of the relevant game (in this example, FarmVille) and also generates the optimal priority matrix by a suitable pathfinding algorithm. Then the simulator 306 outputs the statistics 806 being considered. After visualization and analysis, those valid results are input into the objective function 808. The metric optimization tool 308 takes the current parameters and the value of the objective function, uses a machine learning algorithm and suggests a new set of parameter values (operation 712, FIG. 7). The simulator 306 takes these new parameter values, re-runs and generates another set of inputs for the metric optimization tool 308, which would then suggest another updated set of parameter values for the simulator 306. This process repeats and as the parameter space being searched is large enough, an optimal parameter set (or at least a parameter set that is close to optimal) is obtained.

It is a benefit of the described techniques that they not only provide for improved quality in-game tuning, but that this improvement in quality is achieved while increasing tuning speed and reducing human resources load. Good tuning may allow players to enjoy the game more and bring in more revenue. A badly tuned game may create dissatisfaction to players leading to them quitting the game.

Current approaches for tuning economic and gameplay parameters often consist of manual adjustment of parameter values by tuning experts. These methods have significant drawbacks when compared with the described automated game tuning techniques. First, the parameter space is extremely large. Searching the space by manually adjusting feature values is a tedious and expensive process. Since manual searches cannot possibly investigate all available possibilities, there is no guarantee that a "good" or optimal tuning will be found.

Current processes of manual tuning using spreadsheets to simulate gameplay typically consumes more than 10 hours to run one round of simulation for an entire game. New games can take approximately 2-3 months to tune while single game features often take about 1 month to tune. Lastly, success and efficiency of the tuning highly depends on tuning experts and it takes about 6 months to train a person to learn the process.

The tuning optimization tools and systems as described that automates the game tuning process and finds better tuning parameter values for a given game. These tools can not only dramatically shorten tuning time, but greatly enlarge the searching space and enhance the tuning quality. Moreover, it removes dependency on tuning experts, allows for ongoing tuning of a game as the game evolves, and provides PMs with a tool to tune features and entire products quickly and efficiently.

It will be seen from the above-described example embodiment that some aspects of the disclosure provides for a system for automated assistance in game design, to a method for designing at least parts of a game using the system, and to a computer-readable storage medium having stored thereon instructions for causing a machine to perform the method, when the instructions are executed by the machine. The method may comprise:

defining a performance metric indicative of player performance in a computer-implemented game having a set of tunable parameters comprising multiple in-game parameters that are variable by a game administrator to change gameplay difficulty;

defining a performance target that represents respective target values for the performance metric at one or more points of progress in the game; and in an iterative tuning operation performed by one or more computer processor devices configured to perform the iterative tuning operation based at least in part on the performance target, determining a suggested value set for the set of tunable parameters, each iteration of the iterative tuning operation.

In some embodiments, each iteration of the iterative tuning operation may include executing a gameplay simulation, determining a simulation result that represents respective values for the performance metric at one or more points of progress in the gameplay simulation, and/or automatically modifying the candidate set of parameter values based at least in part on a comparison between the performance target and the simulation result for the gameplay simulation.

In some embodiments, the gameplay simulation may include automated playing of the game by an artificial agent in accordance with a candidate set of parameter values for the set of tunable parameters.

In some embodiments, the performance metric is defined is a function of a group of performance measures indicating different respective aspects of player performance in the game. In some embodiments, the group of performance measures may include level progress indicating progression of the player through different levels of the game. In some embodiments, the group of performance measures may include experience points earned by the player. In some embodiments, the group of performance measures may include in-game currency earned by the player. In some embodiments, the group of performance measures may include revenue generated due to in-game purchases by the player. In some embodiments, the group of performance measures may include the number of instances of performance by the player of one or more specified in-game actions.

In some embodiments, the performance target may include a target curve that represents respective target values for the performance metric at multiple different points of progress in the game. In some embodiments, the simulation result may include a result curve that represents respective values for the performance metric at multiple different points of progress in the gameplay simulation. In some embodiments, the automatic modification of the candidate set of parameter values is based at least in part on a comparison between the target curve and the result curve.

In some embodiments, the iterative tuning operation may comprise minimizing one or more differences between the result curve and the target curve. For example, the iterative tuning operation may comprise optimizing the set of game parameters to minimize the distance between an endpoint of the target curve and an endpoint of the result curve. Instead, or in addition, the iterative tuning operation may comprise optimizing the set of game parameters to minimize an graph area between the target curve and the result curve.

Some aspects of the disclosure provide for a method, system and computer-readable storage media for performing the method, the method comprising:

defining a performance metric indicative of player performance in a computer-implemented game having a tunable game configuration that is changeable by a game administrator to change gameplay difficulty, the performance metric being a function of a plurality of performance measures indicating different aspects of player performance in the game;

defining a performance target that represents respective target values for the performance metric at one or more points of progress in the game; and in an iterative tuning operation performed by one or more computer processor devices configured to perform the iterative tuning operation based at least in part on the performance target, determining a suggested game configuration, each iteration of the iterative tuning operation comprising:

executing a gameplay simulation comprising automated playing of the game by an artificial agent in accordance with a candidate game configuration;

determining a simulation result that represents respective values for the performance metric at different points of progress in the gameplay simulation; and in an automated adjustment operation performed using at least one computer processor device configured therefore, automatically adjusting the candidate game configuration based at least in part on a comparison between the performance target and the simulation result for the gameplay simulation.

The tunable game configuration may comprise a priority matrix that defines sequential relationships between a plurality of different in-game actions, thus providing one or more predefined sequences in which respective in-game actions are to be performed for achieving corresponding in-game benefits.

The executing of the gameplay simulation for at least some iterations of the iterative tuning operation may comprise executing the gameplay simulation in accordance with a candidate priority matrix, each corresponding automated adjustment operation comprising automatically adjusting the candidate priority matrix based at least in part on the comparison between the performance target and the simulation result for the gameplay simulation.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 5:
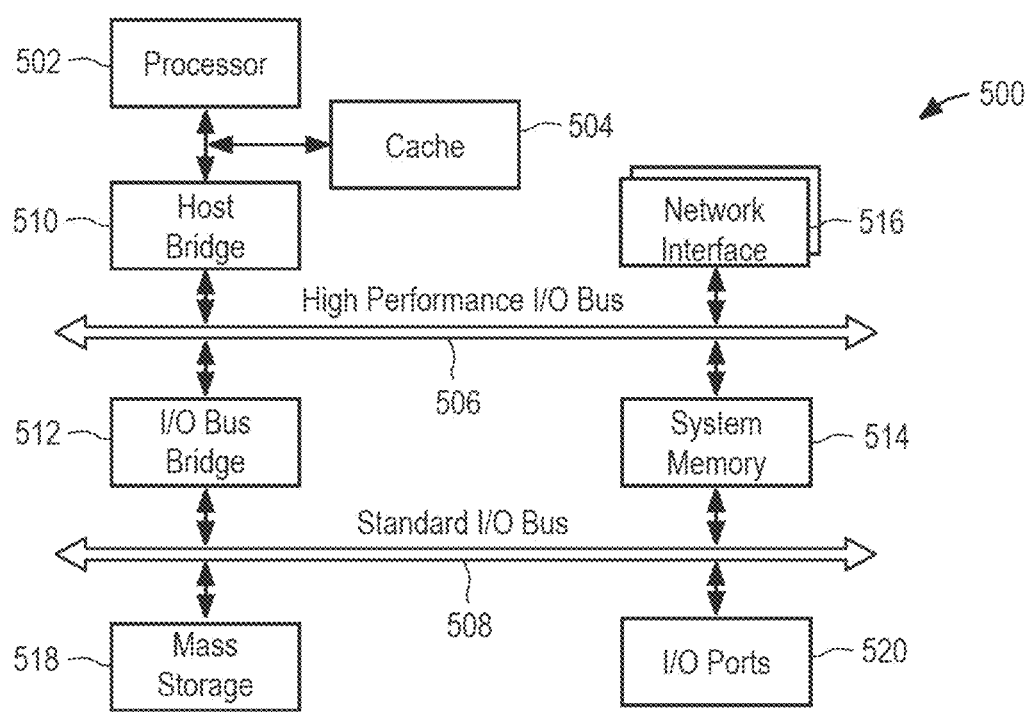
FIG. 5 illustrates an example computing system architecture, which may be used to implement a server or a client system illustrated in FIG. 6, according to some example embodiments.
Figure 6:
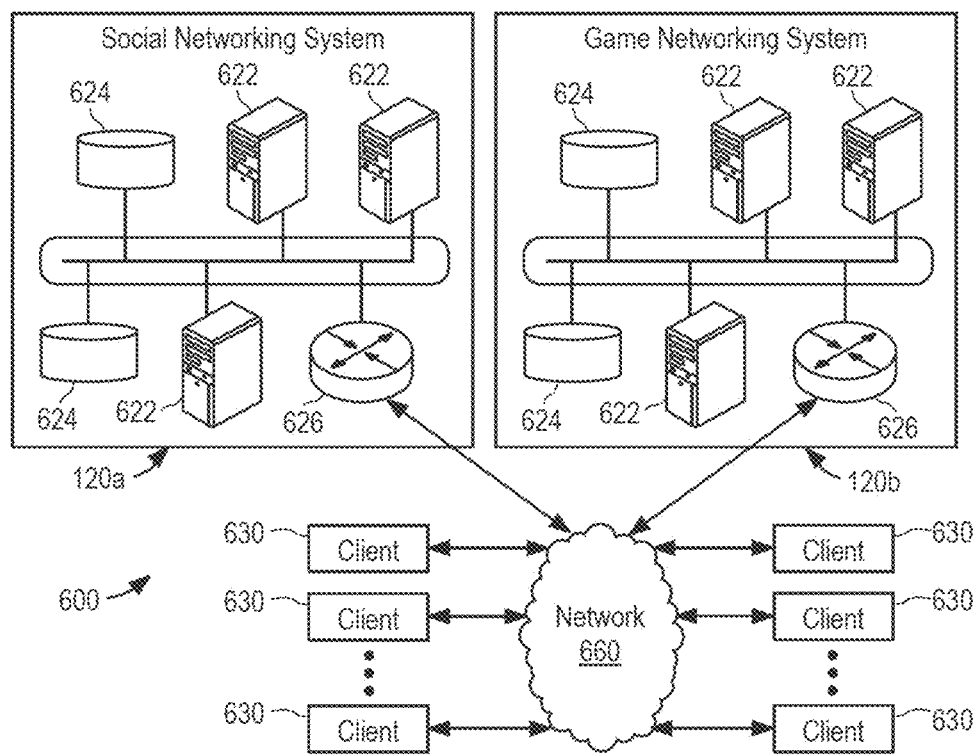
FIG. 6 illustrates an example network environment, in which various example embodiments may operate.

FIG. 5 illustrates an example computing system architecture, which may be used to implement a server 1022 or a client system 1030 illustrated in FIG. 6. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 may couple to bus 506. Hardware system 500 may further include video memory (not shown) and a display device coupled to the video memory. Mass storage 518 and 1/O ports 520 may couple to bus 508. Hardware system 500 may optionally include a keyboard, a pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers 1022, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present disclosure may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 6 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment comprising one or more networking systems, such as social networking system 120a, game networking system 120b, and one or more client systems 630. The components of social networking system 120a and game networking system 120b operate analogously; as such, hereinafter they may be referred to simply at networking system 620. Client systems 630 are operably connected to the network environment via a network service provider, a wireless carrier, or any other suitable means.

Networking system 120 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 622 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, Action-Script, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document Sequence Generator or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 6 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Although the above example embodiments described as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality Miscellaneous One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
defining a performance metric indicative of player performance in a computer-implemented game having a set of tunable parameters comprising multiple in-game parameters that are variable by a game administrator to change gameplay difficulty;
defining a performance target that represents respective target values for the performance metric at a plurality of points of progress in the game; and
in an iterative tuning operation performed by one or more computer processor devices configured to perform the iterative tuning operation based at least in part on the performance target, determining a suggested value set for the set of tunable parameters by modifying respective parameter values for a plurality of the parameters in the set of tunable parameters, each iteration of the iterative tuning operation comprising:
executing a gameplay simulation comprising automated playing of the game by an artificial agent in accordance with a candidate set of parameter values for the set of tunable parameters;
determining a simulation result that represents respective values for the performance metric at a plurality of points of progress in the gameplay simulation; and
automatically modifying the candidate set of parameter values based at least in part on a comparison between the performance target and the simulation result for the gameplay simulation.

2. The method of claim 1, wherein the performance metric is defined is a function of a plurality of performance measures indicating different respective aspects of player performance in the game.

3. The method of claim 2, wherein the plurality of performance measures include level progress indicating progression of the player through different levels of the game.

4. The method of claim 2, wherein the plurality of performance measures include experience points earned by the player.

5. The method of claim 2, wherein the plurality of performance measures include in-game currency earned by the player.

6. The method of claim 2, wherein the plurality of performance measures include revenue generated due to in-game purchases by the player.

7. The method of claim 2, wherein the plurality of performance measures include the number of instances of performance by the player of one or more specified in-game actions.

8. The method of claim 1, wherein the performance target comprises a target curve that represents respective target values for the performance metric at multiple different points of progress in the game.

9. The method of claim 8, wherein the simulation result comprises a result curve that represents respective values for the performance metric at multiple different points of progress in the gameplay simulation.

10. The method of claim 9, wherein the automatic modification of the candidate set of parameter values is based at least in part on a comparison between the target curve and the result curve.

11. The method of claim 10, wherein the comparison between the performance target and the simulation result comprises minimizing a difference between respective endpoints of the target curve and the result curve.

12. The method of claim 10, wherein the comparison between the performance target and the summation result comprises minimizing an in-graph area between the target curve and the result curve.

13. The method of claim 1, wherein the set of tunable parameters comprises a priority matrix that defines sequential relationships between a plurality of different in-game actions, thus providing one or more predefined sequences in which respective in-game actions are to be performed for achieving corresponding in-game benefits.

14. The method of claim 13, wherein the executing of the gameplay simulation for at least some iterations of the iterative tuning operation comprises executing the gameplay simulation in accordance with a candidate priority matrix, each corresponding automated adjustment operation comprising automatically adjusting the candidate priority matrix based at least in part on the comparison between the performance target and the simulation result for the gameplay simulation.

15. A system comprising:
an input interface configured to receive
a definition of a performance metric indicative of player performance in a computer-implemented game having a set of tunable parameters comprising multiple in-game parameters that are variable by a game administrator to change gameplay difficulty, the performance metric being a function of a plurality of performance measures indicating different aspects of player performance in the game; and
a performance target that represents respective target values for the performance metric at one or more points of progress in the game; and
an optimization engine configured to determine a suggested game configuration by performing an iterative tuning operation based at least in part on the performance target, the determining of the suggested game configuration including determining suggested values for the set of tunable parameters by modifying respective parameter values for a plurality of the parameters in the set of tunable parameters, each iteration of the iterative tuning operation comprising:
executing a gameplay simulation comprising automated playing of the game by an artificial agent in accordance with a candidate game configuration;
determine a simulation result that represents respective values for the performance metric at different points of progress in the gameplay simulation; and
in an automated adjustment operation performed using at least one computer processor device configured therefore, automatically adjust the candidate game configuration based at least in part on a comparison between the performance target and the simulation result for the gameplay simulation.

16. The system of claim 15, wherein the performance target comprises a target curve that represents respective target values for the performance metric at multiple different points of progress in the game, the simulation result comprising a result curve that represents respective values for the performance metric at multiple different points of progress in the gameplay simulation.

17. The system of claim 16, wherein the comparison between the performance target and the simulation result comprises minimizing a difference between respective endpoints of the target curve and the result curve.

18. The system of claim 17, wherein the comparison between the performance target and the summation result comprises minimizing an in-graph area between the target curve and the result curve.

19. The system of claim 15, wherein the set of tunable parameters comprises a priority matrix that defines sequential relationships between a plurality of different in-game actions, thus providing one or more predefined sequences in which respective in-game actions are to be performed for achieving corresponding in-game benefits.

20. A non-transitory computer-readable storage medium having stored thereon instructions that, when executed by a machine, cause the machine to perform operations comprising:
enable definition of a performance metric indicative of player performance in a computer-implemented game having a set of tunable parameters comprising multiple in-game parameters that are variable by a game administrator to change gameplay difficulty;
enable definition of a performance target that represents respective target values for the performance metric at a plurality of points of progress in the game; and
perform an iterative tuning operation to determine a suggested value set for the set of tunable parameters by modifying respective parameter values for a plurality of the parameters in the set of tunable parameters, each iteration of the iterative tuning operation comprising:
executing a gameplay simulation comprising automated playing of the game by an artificial agent in accordance with a candidate set of parameter values for the set of tunable parameters;
determining a simulation result that represents respective values for the performance metric at a plurality of points of progress in the gameplay simulation; and
automatically modifying the candidate set of parameter values based at least in part on a comparison between the performance target and the simulation result for the gameplay simulation.

* * * * *